US012670326B1

(12) United States Patent
Ben Shoham et al.

(10) Patent No.: US 12,670,326 B1
(45) Date of Patent: Jun. 30, 2026

(54) PIVOTAL TOKEN SEARCH BY PERPLEXITY

(71) Applicant: Intuit Inc., Mountain View, CA (US)

(72) Inventors: Ofir Ben Shoham, Hod Hasharon (IL);
Matan Vetzler, Givatayim (IL); **Amir
Bialer, Tel Aviv (IL); Shai Ardazi**,
Petach-Tikva (IL)

(73) Assignee: Intuit Inc., Mountain View, CA (US)

( * ) Notice: Subject to any disclaimer, the term of this
patent is extended or adjusted under 35
U.S.C. 154(b) by 0 days.

(21) Appl. No.: 19/274,475

(22) Filed: Jul. 18, 2025

(51) Int. Cl.
*G06F 40/284* (2020.01)
*G06F 40/166* (2020.01)
(52) U.S. Cl.
CPC .......... *G06F 40/284* (2020.01); *G06F 40/166*
(2020.01)
(58) Field of Classification Search
CPC ............................ G06F 40/284; G06F 40/166
See application file for complete search history.

(56) References Cited

U.S. PATENT DOCUMENTS

| | | | | |
|---|---|---|---|---|
| 5,995,920 | A * | 11/1999 | Carbonell | G06F 40/10 |
| | | | | 704/9 |
| 12,406,143 | B2 * | 9/2025 | Ahmed | G06F 40/30 |
| 2008/0288537 | A1 * | 11/2008 | Golovchinsky | G06F 16/41 |
| 2017/0206191 | A1 * | 7/2017 | Biegert | G06F 40/30 |
| 2020/0380075 | A1 * | 12/2020 | Boada | G06F 18/22 |
| 2022/0083579 | A1 * | 3/2022 | Singh | G06F 18/22 |
| 2023/0065965 | A1 * | 3/2023 | Liu | G06F 40/166 |
| 2023/0409832 | A1 * | 12/2023 | Chemmengath | G06F 16/35 |
| 2024/0135089 | A1 * | 4/2024 | Lyu | G06F 40/232 |
| 2024/0273288 | A1 * | 8/2024 | Gashteovski | G06F 40/253 |
| 2025/0053725 | A1 * | 2/2025 | Zhou | G06F 40/30 |
| 2025/0061316 | A1 * | 2/2025 | Gobriel | G06N 3/045 |
| 2025/0061339 | A1 * | 2/2025 | Estornell | G06N 3/092 |
| 2025/0111127 | A1 * | 4/2025 | Jones | G06F 40/253 |
| 2025/0131208 | A1 * | 4/2025 | Luong | G06N 3/045 |
| 2025/0133037 | A1 * | 4/2025 | Jensen | H04L 51/02 |
| 2025/0217594 | A1 * | 7/2025 | Zhou | G06F 40/295 |
| 2025/0252263 | A1 * | 8/2025 | Yang | G06F 40/30 |
| 2025/0258994 | A1 * | 8/2025 | Plotkin | G06F 40/274 |

OTHER PUBLICATIONS

Abdin, Marah, et al. "Phi-4 technical report." arXiv preprint arXiv:2412.
08905 (2024).

* cited by examiner

*Primary Examiner* — Fariba Sirjani
(74) *Attorney, Agent, or Firm* — Paradice & Li LLP

(57) ABSTRACT

Systems and methods for identifying pivotal tokens are
disclosed herein. An example method is performed by one or
more processors of a computing system. The example
method may include receiving, over a communications
network from a computing device, a transmission including
one or more input texts formed from a token sequence. The
example method may include generating substitute token
candidates for each input text based on its context, each
substitute token candidate mapped to a resultant text in
which the substitute token candidate replaces one or more
tokens in the sequence. The example method may include
determining a baseline perplexity score for each input text.
The example method may include determining a candidate
perplexity score for each resultant text associated with each
input text. The example method may include identifying one
or more pivotal tokens within each input text based on the
baseline perplexity scores and the candidate perplexity
scores.

16 Claims, 7 Drawing Sheets

400

600

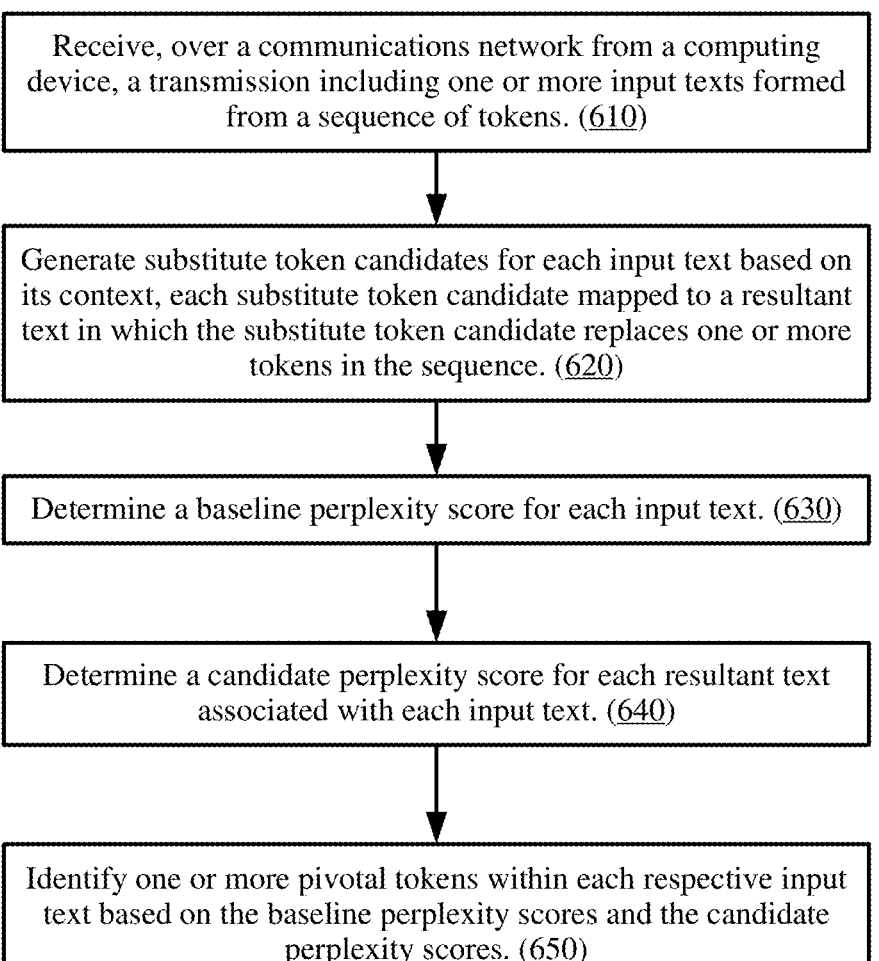

Receive, over a communications network from a computing device, a transmission including one or more input texts formed from a sequence of tokens. (610)

Generate substitute token candidates for each input text based on its context, each substitute token candidate mapped to a resultant text in which the substitute token candidate replaces one or more tokens in the sequence. (620)

Determine a baseline perplexity score for each input text. (630)

Determine a candidate perplexity score for each resultant text associated with each input text. (640)

Identify one or more pivotal tokens within each respective input text based on the baseline perplexity scores and the candidate perplexity scores. (650)

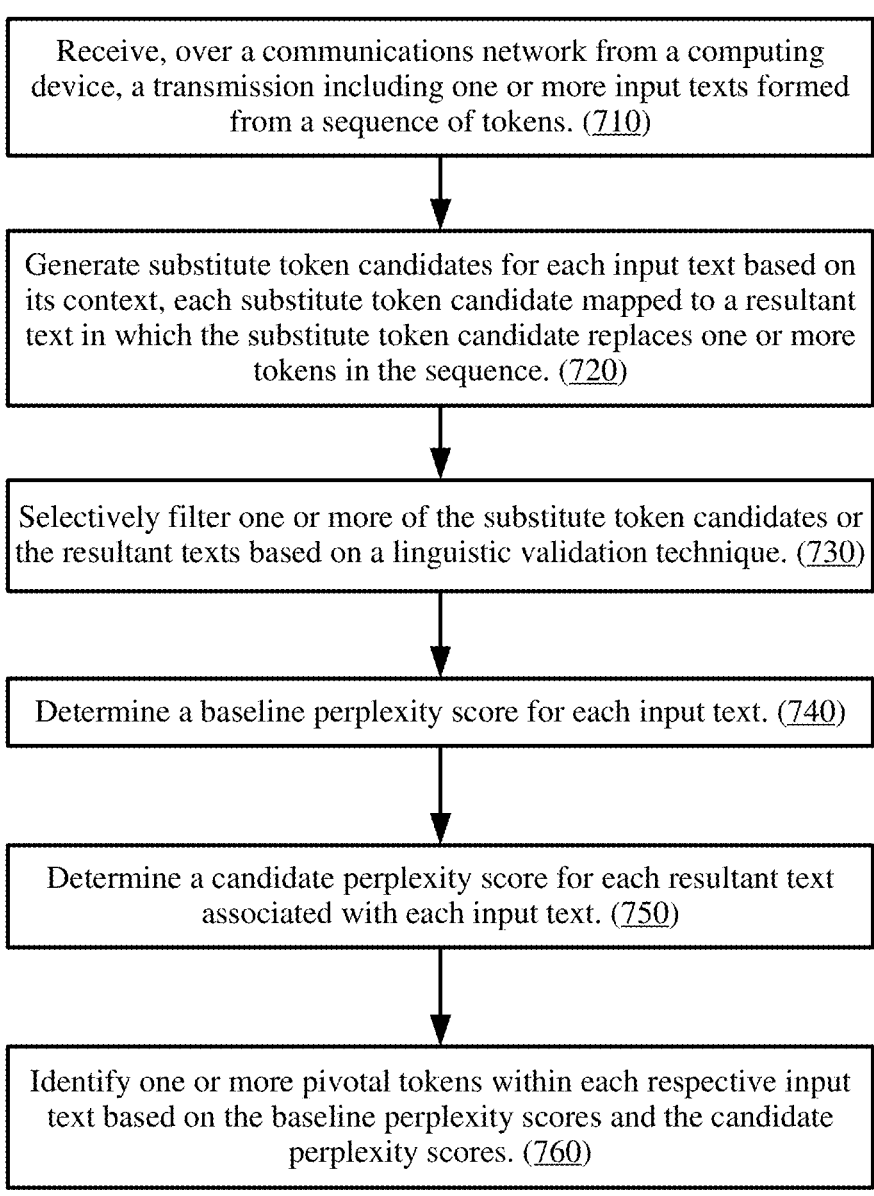

Receive, over a communications network from a computing device, a transmission including one or more input texts formed from a sequence of tokens. (710)

Generate substitute token candidates for each input text based on its context, each substitute token candidate mapped to a resultant text in which the substitute token candidate replaces one or more tokens in the sequence. (720)

Selectively filter one or more of the substitute token candidates or the resultant texts based on a linguistic validation technique. (730)

Determine a baseline perplexity score for each input text. (740)

Determine a candidate perplexity score for each resultant text associated with each input text. (750)

Identify one or more pivotal tokens within each respective input text based on the baseline perplexity scores and the candidate perplexity scores. (760)

*Figure 7*

PIVOTAL TOKEN SEARCH BY PERPLEXITY

TECHNICAL FIELD

This disclosure relates generally to identifying pivotal tokens, and specifically to identifying pivotal tokens in an input text based on perplexity scores.

DESCRIPTION OF RELATED ART

Language models (LMs) have revolutionized natural language processing (NLP) by enabling machines to generate text that closely resembles human language based on predicting the next token in a sequence. An LM's performance is often evaluated based on its ability to produce accurate and coherent output. This ability can be greatly increased when certain "pivotal" tokens that significantly impact the meaning and correctness of the generated text are correctly identified, as their accurate production has a substantial impact on determining the overall correctness of the LM's final output. Indeed, identifying pivotal tokens has numerous applications, such as enabling developers to concentrate model optimization on the most influential tokens, generating training data, revealing internal reasoning pathways, and fine-tuning models toward more accurate, coherent, or efficient behavior.

For example, pivotal tokens may be used to facilitate the generation of training pairs for direct preference optimization (DPO), which is a technique for aligning LMs with (e.g., human) preferences without relying on traditional reinforcement learning (RL) or a separate reward model. The DPO process includes comparing pairs of model outputs (one preferred and one dispreferred) and applying a preference loss function to steer the model toward favoring higher-probability outputs that align with the desired preferences. Some techniques use pivotal tokens to facilitate the generation of DPO pairs in domains where there is an objective ("correct") answer, such as mathematics and coding. For instance, a likelihood of each completion being correct may be calculated based on a final mathematical answer or a unit test in conjunction with an oracle, which is a system or definitive source of truth that can programmatically judge whether a model's generated answer is correct or incorrect. Specifically, each word in a given text may be iterated through, replaced with alternative words, and then assessed (using the oracle) to determine whether the resulting text is correct or incorrect. If changing a term alters the outcome of the mathematical answer or unit test, it may be deemed likely that the term is pivotal (and vice versa). By sampling many completions and checking them all with the oracle, these techniques essentially use a brute-force method to identify pivotal and non-pivotal tokens in objective ("correct" or "not correct") domains.

Although these techniques can function well in straightforward domains like code generation and mathematical reasoning (i.e., where clear oracles can exist), they cannot be effectively applied in more nuanced or subjective scenarios. Indeed, there are no reliable techniques for identifying pivotal tokens based on complex data from legal documents, scientific literature, or creative writing, because "correctness" cannot be easily defined in these domains. In other words, simple pass/fail mechanisms are insufficient when tokens carry layered meanings that depend on context.

Furthermore, conventional techniques for generating negative examples for DPO often rely on using earlier model checkpoints or weakened models, which can result in "trivially bad" examples that are easily distinguishable from high-quality responses. Yet other techniques induce randomness and incoherence by using intentionally suboptimal parameters (e.g., high temperatures). However, these approaches provide limited results, as they primarily teach the model to avoid simple mistakes rather than learning nuanced differences between good and excellent responses.

There has yet to be any reliable technique for identifying pivotal tokens in nuanced or subjective scenarios where determining what is correct, relevant, or preferred depends on subtle factors like context or individual perspectives. Consequently, there remains a significant need for systems and methods that can effectively identify pivotal tokens across various domains, including those with ambiguity in language, context-rich material, or subjective or non-binary outcomes.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for identifying pivotal tokens. An example method is performed by one or more processors of a computing system. The example method can include receiving, over a communications network from a computing device, a transmission including one or more input texts formed from a sequence of tokens. The example method can include generating substitute token candidates for each input text based on its context, each substitute token candidate mapped to a resultant text in which the substitute token candidate replaces one or more tokens in the sequence. The example method can include determining a baseline perplexity score for each input text. The example method can include determining a candidate perplexity score for each resultant text associated with each input text. The example method can include identifying one or more pivotal tokens within each respective input text based on the baseline perplexity scores and the candidate perplexity scores.

Another innovative aspect of the subject matter described in this disclosure can be implemented in a computing system for identifying pivotal tokens. An example system includes one or more processors and at least one memory coupled to the one or more processors and storing instructions that, when executed by the one or more processors, cause the system to perform operations. The operations can include receiving, over a communications network from a computing device, a transmission including one or more input texts formed from a sequence of tokens. The operations can include generating substitute token candidates for each input text based on its context, each substitute token candidate mapped to a resultant text in which the substitute token candidate replaces one or more tokens in the sequence. The operations can include selectively filtering one or more of the substitute token candidates or the resultant texts based on a linguistic validation technique. The operations can include determining a baseline perplexity score for each input text. The operations can include determining a candidate perplexity score for each resultant text associated with each input text. The operations can include identifying one or more pivotal tokens within each respective input text based on the baseline perplexity scores and the candidate perplexity scores.

Another innovative aspect of the subject matter described in this disclosure can be implemented as a non-transitory computer-readable medium storing instructions that, when executed by one or more processors of a system for identifying pivotal tokens, cause the system to perform operations. The operations can include receiving, over a communications network from a computing device, a transmission including one or more input texts formed from a sequence of tokens. The operations can include generating substitute token candidates for each input text based on its context, each substitute token candidate mapped to a resultant text in which the substitute token candidate replaces one or more tokens in the sequence. The operations can include selectively filtering one or more of the substitute token candidates or the resultant texts based on a linguistic validation technique. The operations can include determining a baseline perplexity score for each input text. The operations can include determining a candidate perplexity score for each resultant text associated with each input text. The operations can include identifying one or more pivotal tokens within each respective input text based on the baseline perplexity scores and the candidate perplexity scores.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an illustrative flowchart depicting an example operation for identifying pivotal tokens, according to some implementations.

FIG. 7 shows an illustrative flowchart depicting an example operation for identifying pivotal tokens, according to some implementations.

Like numbers reference like elements throughout the drawings and specification.

DETAILED DESCRIPTION

Figure 1:
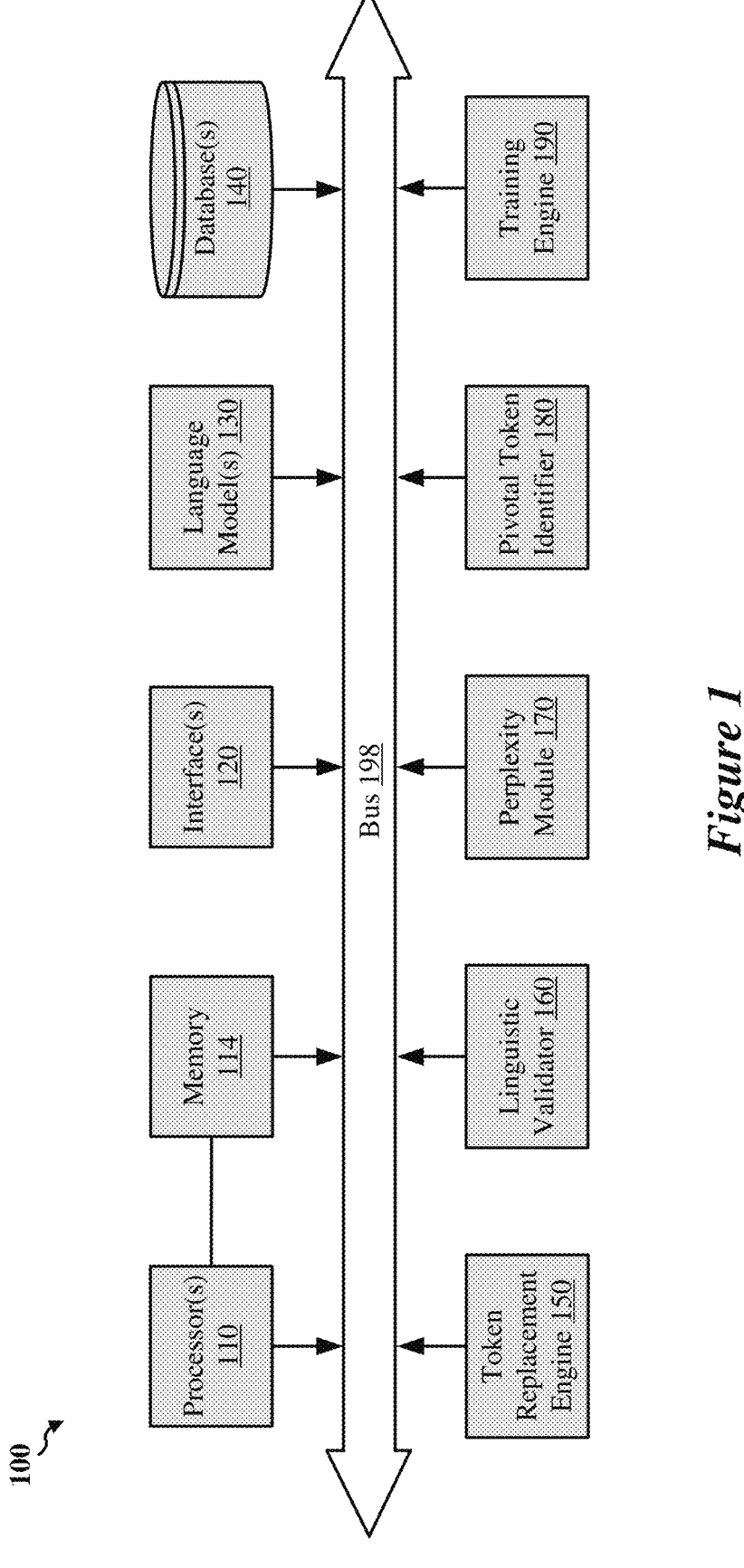
FIG. 1 shows an example computing system, according to some implementations.

As described above, conventional techniques for identifying pivotal tokens in text have been limited to domains with clear oracles, such as mathematics and coding. However, these methods fall short when applied to more nuanced or subjective scenarios where determining correctness depends on subtle factors like context or individual perspectives. Additionally, existing approaches for generating negative examples for direct preference optimization (DPO) training are lacking in efficiency and accuracy.

To address these challenges, aspects of the present disclosure provide specific steps for identifying (or "searching" for) pivotal tokens in text, such as by using language models (LMs) to generate candidate token replacements and evaluate relative token importance based on determining context-rich perplexity scores for the original text and the candidate replacements. Aspects of the present disclosure recognize that, in natural language processing (NLP), perplexity measures how well a model predicts a sequence of words, with lower values indicating more accurate predictions and higher values indicating greater uncertainty or "surprise," thereby representing the model's confidence in its predictions. Specifically, perplexity represents the exponential of the average negative log-likelihood of a sequence of tokens. This measure quantifies how confident the LM is in predicting the next token in the sequence, where lower perplexity indicates that the model assigns higher probability to the observed tokens (indicating better predictive performance) and higher perplexity suggests the model is more uncertain or assigns lower probability to the token sequence.

By using LMs to suggest alternative tokens, calculate perplexity scores, and identify pivotal tokens based on significant increases in perplexity, aspects of the present disclosure displace the need for oracles in identifying pivotal tokens. Specifically, LMs are configured to suggest context-aware alternative tokens, linguistically validate candidate alternatives, and provide a quantitative measure of semantic and syntactic disruption that enables differentiating between truly pivotal tokens (i.e., that cause logical or semantic misalignment) and tokens that merely affect readability. Accordingly, the techniques described herein can be used to identify pivotal tokens in nuanced scenarios where correctness or alignment are grounded in context-rich or subjective assessments. Furthermore, the techniques described herein can be scaled to term-level or sentence-level substitutions, thereby enabling pivotal token identification on a granular to high-level scale. By quantifying the disruption caused by token replacement through perplexity scores, aspects of the present disclosure may be used to effectively identify pivotal tokens in any context, thereby providing a generalized framework for pivotal token identification.

Specifically, aspects of the present disclosure provide systems and methods for identifying pivotal tokens in input text by using perplexity scores to evaluate the impact of replacing various sequences of tokens in the input text. The method includes receiving input text formed from a sequence of tokens, generating substitute token candidates based on context, determining baseline and candidate perplexity scores based on context, and identifying pivotal tokens based on these scores. In some aspects, the input text corresponds to output tokens from an LM that align with a preferred response to a particular prompt. In some instances, substitute token candidates are generated for each token in the input text based on an LM vocabulary. In some other instances, substitute token candidates are selectively generated based on context. Furthermore, substitute token candidates and/or corresponding resultant texts may be selectively filtered using linguistic validation techniques, thereby increasing coherence and relevance. Each pivotal token may comprise a subsequence of tokens forming any number of tokens, terms, or sentences within the input text sequence. The pivotal tokens may be identified based on determining perplexity differences between the baseline and candidate scores.

The systems and methods described herein provide several technical benefits over conventional solutions for identifying pivotal tokens. By using context-aware LMs to suggest alternative tokens, calculate perplexity scores, and identify pivotal tokens based on significant increases in perplexity, the system eliminates the need for oracles in nuanced or subjective scenarios. By selectively generating substitute token candidates based on context and filtering resultant texts using linguistic validation techniques, the system ensures coherence and relevance of candidate alternatives. By quantifying the disruption caused by token replacement through perplexity scores, the system enables differentiating between truly pivotal tokens and tokens that merely affect readability. By identifying pivotal tokens at a granular to high-level scale, including term-level or sentence-level substitutions, the system provides a generalized framework for pivotal token identification across various domains. By generating training data based on pivotal tokens and flagged resultant texts, the system facilitates DPO techniques and enables LMs to learn nuanced differences between good and excellent responses. By automating the process of identifying pivotal tokens and generating high-quality training data, the system reduces manual effort, accelerates model development, and improves overall performance of LMs in a wide range of applications. By providing a quantitative measure of semantic and syntactic disruption, the system enables precise evaluation of token importance and facilitates informed decision-making in NLP tasks.

Aspects of the present disclosure address the technical problem of identifying pivotal tokens in input text, which is a challenge in NLP and DPO domains. This problem arises from the limitations of conventional approaches that rely on oracles or simplistic methods to identify pivotal tokens, which can lead to inaccurate or incomplete results. Aspects of the present disclosure recognize that perplexity scores provide valuable insights into token importance and solve this technical problem by providing innovative systems and methods for identifying pivotal tokens based on perplexity scores. In particular, the Specification and claims describe a method of identifying pivotal tokens in input text, which includes receiving input text formed from a sequence of tokens, generating substitute token candidates based on context, determining baseline and candidate perplexity scores, and identifying pivotal tokens based on these scores.

Furthermore, aspects of the subject matter disclosed herein are not an abstract idea, such as a mere mental process that can be performed solely by the human mind. For example, while a human may attempt to manually evaluate the importance of tokens in input text or estimate token relevance based on limited information, they cannot feasibly analyze complex perplexity scores across thousands of tokens and sequence positions in real-time, nor can they capture nuanced trends and patterns indicative of token importance with high precision. Furthermore, the present disclosure leverages sophisticated computational techniques (e.g., training LMs to suggest alternative tokens, computing perplexity scores based on these alternatives, and continuously updating predictions using advanced statistical models) that achieve results far beyond human capability, thereby providing a technical solution to the technical problem of identifying pivotal tokens in input text. Moreover, the subject matter disclosed herein is not directed to organizing human activity or any conventional economic practice, but rather provides a technical solution to a problem that requires sophisticated computer technology. Specifically, various implementations of the present disclosure provide specific inventive steps to automate the identification of pivotal tokens using perplexity scores, thereby improving the accuracy, efficiency, and scalability of NLP and DPO techniques in modern computer-based systems.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an example computing system 100, according to some implementations. Various aspects of the computing system 100 disclosed herein are generally applicable for identifying pivotal tokens. The computing system 100 includes a combination of one or more processors 110, a memory 114 coupled to the one or more processors 110, one or more interfaces 120, one or more language models (LMs) 130, one or more databases 140, a token replacement engine 150, a linguistic validator 160, a perplexity module 170, a pivotal token identifier 180, and/or a training engine 190. In some implementations, the various components of the computing system 100 are interconnected by at least a data bus 198. In some other implementations, the various components of the computing system 100 are interconnected using other suitable signal routing resources. In some implementations, the computing system 100 does not include one or more components illustrated in FIG. 1. For example, in various implementations, the computing system 100 may not include (and/or may have access to) one or more of the interface 120, the LMs 130, the linguistic validator 160, and/or the training engine 190.

The processor 110 includes one or more suitable processors capable of executing scripts or instructions of one or more software programs stored in the computing system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more hardware accelerators for processing a large amount of data and/or one or more artificial intelligence (AI) accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 110 may use hardware-based TPUs to process and/or adjust millions, billions, or trillions of artificial neural network (ANN) parameters within seconds, milliseconds, or microseconds. As another example, one or more hardware-based NPUs may be used to accelerate ANN computations based on being optimized for efficiently executing deep learning (DL) techniques and performing AI and/or ML tasks (e.g., image recognition, natural language processing (NLP), executing trained AI models for inference, and the like).

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. Some implementations may incorporate specialized memory to support high-performance algorithm execution, particularly to address data transfer bottlenecks during AI and/or ML tasks, such as DL training and inference. For example, High Bandwidth Memory (HBM) may be used due to incorporating 3D-stacked dynamic random-access memory (DRAM) dies connected by through-silicon vias (TSVs), thereby enabling significantly faster data transfer rates between memory and processing units compared to conventional memory architectures. Implementations of the subject matter disclosed herein are not limited to any specific combination of hardware circuitry and/or software.

One or more input/output (I/O) interfaces (e.g., the interface 120) may be used for transmitting or receiving (e.g., over a communications network, such as the Internet or an intranet) transmissions, input texts, tokens, sequences, terms, sentences, resultant texts, substitute token candidates, training data, direct preference optimization (DPO) pairs, input prompts, output tokens, or the like. The interface 120 may also be used to provide or receive other suitable information, such as computer code for updating one or more programs stored on the computing system 100, internet protocol requests and results, or the like. An example interface includes a wired interface or wireless interface to the Internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the computing system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the computing system 100 by a local user or moderator.

The one or more LMs 130 may be any suitable generative AI model trained on a large corpus of text to generate written responses, answer questions, translate language, and/or assist with various NLP-based tasks. The generations may be output by the LM 130 as a sequence of concatenated output tokens in the form of strings of text. In various implementations, the generations may be referred to herein as input texts, responses, output sequences, results, or the like. In some implementations, one or more of the LMs 130 may be used to generate baseline output sequences, as described at least with respect to FIG. 3. Each of the LMs 130 may be associated with a model vocabulary comprising tens of thousands to hundreds of thousands of unique tokens (e.g., characters or combinations of characters). In some implementations, one or more of the LMs 130 may be trained to generate output aligned with one or more (e.g., human) preferences, as described at least with respect to FIG. 5. In various implementations, the LM 130 may be a large language model (LLM), a multimodal large language model (MLLM), or a small language model (SLM). In various implementations, the LM 130 is integrated directly or embedded into one or more applications (not shown for simplicity) or as a separate service. In various implementations, the LM 130 may receive requests (e.g., from the one or more applications), and may provide responses (e.g., to the one or more applications). In various implementations, the LM 130 may be hosted in conjunction with the computing system 100 (e.g., as a containerized microservice), the LM 130 may be hosted externally (e.g., accessed via one or more application programming interfaces (APIs) or cloud-based services) and in direct communication with one or more of the applications, or the LM 130 may be hosted externally and in indirect communication with the at least one application (e.g., via an intermediate service, application, or system, such as an AI firewall). In various implementations, the LM 130 may use various AI accelerators to process vast amounts of textual data (e.g., from the Internet), integrate with one or more ANNs with millions, billions, trillions, or more weights or parameters, use self-supervised and/or semi-supervised training methods, and/or incorporate aspects of the transformer architecture and/or mixture of experts (MoE). Example LMs may include OpenAI's ChatGPT, Google's Gemini, Meta's LLaMa, BigScience's BLOOM, Baidu's Ernie, Anthropic's Claude, Mistral AI's Mistral, independently developed models, or any another suitable type of generative AI model that outputs strings of text formed by a concatenation of tokens.

The database 140 may store data associated with the computing system 100, such as user data, transmissions, metadata, models, outputs, sequences, tokens, input texts, candidates, resultant texts, LM output context information, perplexity scores, pivotal tokens, terms, sentences, thresholds, coherence values, vocabularies, preferred responses, prompts, training data, DPO pairs, loss values, metrics, features, predictions, likelihoods, and labels, among other suitable information. The database 140 may also store information such as text input history, prompt history, reasoning, dense vectors (e.g., capturing nuanced relationships between prompts and outputs), tokenization metadata (e.g., token-level representations with token strings, positions, and/or byte-pair encoding (BPE) IDs or other tokenizer IDs), latent representations (i.e., hidden states or contextual embeddings extracted from one or more layers of the LM 130), generated output and ranking metadata (e.g., log-probabilities, beam scores, sampling temperatures, decoding parameters, or the like), task-specific annotations or features (e.g., target words, term or sentence context, syntactic roles, semantic roles, dependency tree information, or the like), or any other suitable information that enables the computing system 100 to reuse and trace context across multiple NLP-related tasks, such as generating substitute (or "candidate") tokens, determining perplexity scores, and the like. In various implementations, the database 140 may store vectorized embeddings or other high-dimensional representations and associated feature vectors in a vector space, such as to enable efficient similarity searches, clustering, and advanced AI analytics. In such implementations, portions of the database 140 may incorporate aspects of a vector database or be embedded in a multi-database architecture that enables proximity metrics and vector space computations. In various implementations, the database 140 may store documents, categories, embeddings, lists, entities, arrays, logits, strings, events, datasets, instances, attributes, values, variables, scores, degrees or measures (or other suitable quantities), decision trees, engines, classifiers, formulas, metrics, input, output, queries, responses, requests, application information, instructions, configurations, data associated with attacks and mitigation techniques, data associated with changes, events, change data capture (CDC) information, event bus (EB) information, filters, data assets, preferences, priorities, timestamps, models, algorithms, modules, engines, user information, historical data, recent data, current or real-time data, files, plugins, arrays, tags, queries, feedback, formats, features, among other suitable information. In various implementations, the database 140 stores data associated with artificial neural network (ANN) models, such as the models themselves, untrained models, pretrained models, tuned models, aligned models, reward models, neural network (NN) parameters (e.g., weights, biases, tensors, parameters), architectures (e.g., layer descriptions, neurons, activation functions, overall structures), training data and related information (e.g., statistics, distribution, size, preprocessing steps, training data, text corpora, tuning data, alignment data, alignment data snapshots, alignment preferences, metric logs, accuracies, loss functions and values), hyperparameters (e.g., learning rates, batch sizes, numbers of epochs), evaluation results (e.g., performance metrics and models, validation data, test sets, benchmark scores, thresholds, receiver operating characteristic (ROC) curves, confusion matrices), versioning information (e.g., iterations, updates), metadata and documentation (e.g., usage instructions, authors), deployment configurations (e.g., settings for deploying models in different environments), monitoring data (e.g., real-time or periodic tracking performance in production), or any other suitable data related to ANN models. In various implementations, the database 140 may store data in one or more cloud object storage services, such as one or more Amazon Web Services (AWS)-based Simple Storage Service (S3) buckets. In various implementations, the database 140 incorporates aspects of a database management system (DBMS) or a relational DBMS (RDBMS). In various implementations, the data may be stored in one or more JavaScript Object Notation (JSON) files, comma-separated values (CSV) files, or any other suitable data objects for processing by the computing system 100. In some implementations, the data may be stored in one or more Structured Query Language (SQL) compliant datasets for filtering, querying, and sorting, or any other suitable format for processing by the computing system 100. In various implementations, the database 140 includes a relational database capable of presenting information as datasets in tabular form and capable of manipulating the datasets using relational operators.

Figure 2:
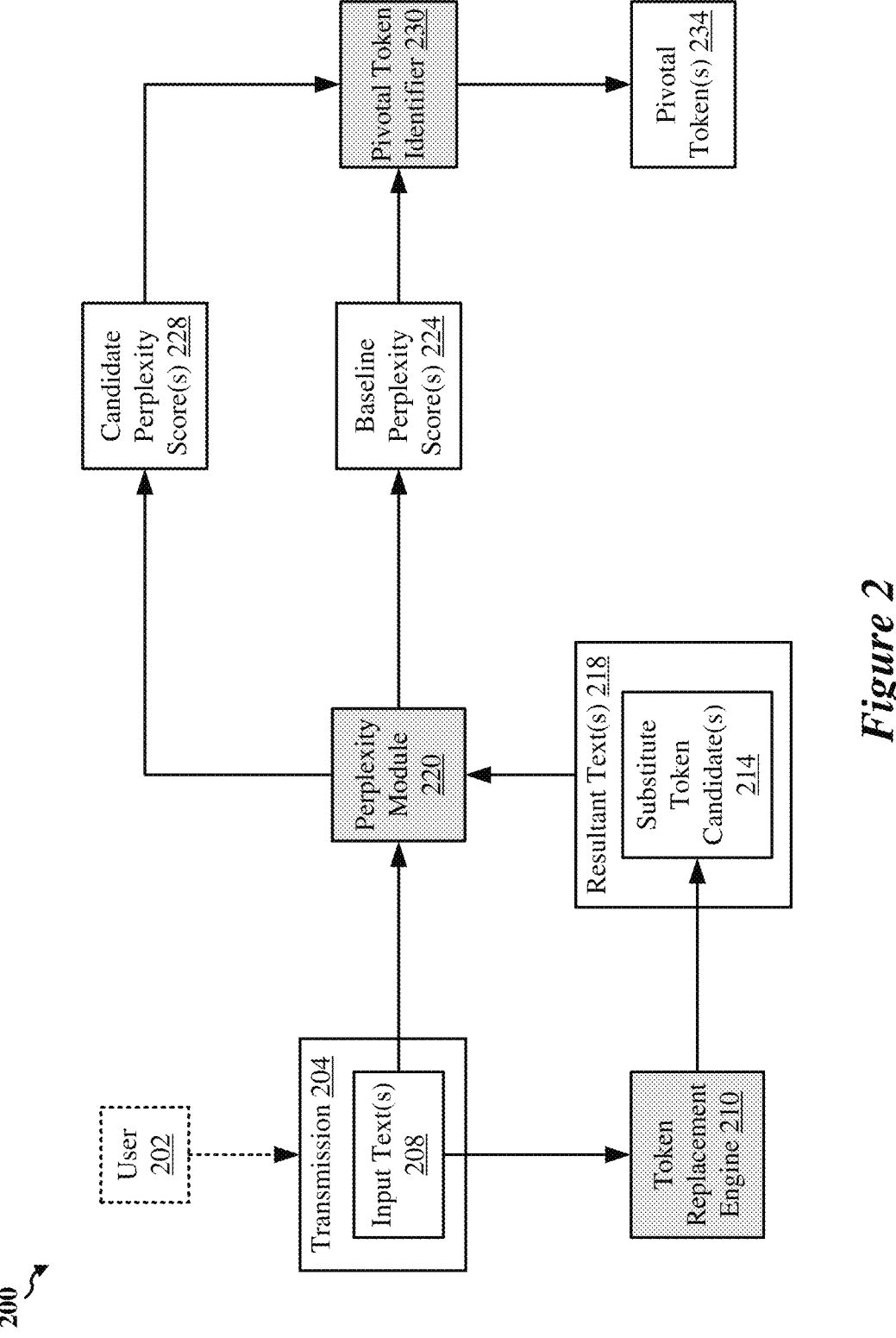
FIG. 2 shows an example process flow for identifying pivotal tokens, according to some implementations.
Figure 4:
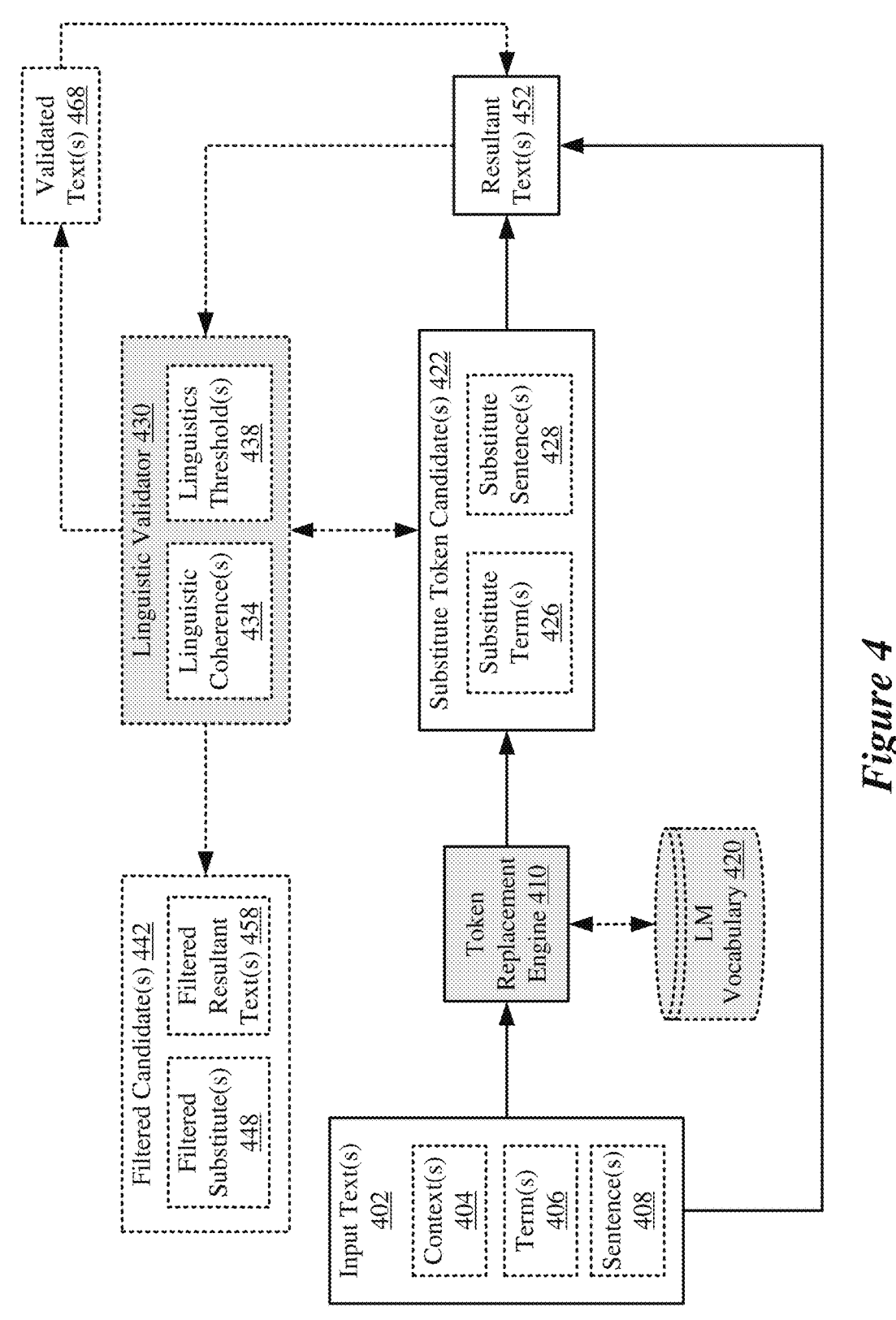
FIG. 4 shows an example process flow for generating substitute tokens and resultant texts, according to some implementations.

The token replacement engine 150 may be used to generate substitute token candidates for input texts and/or resultant texts, as described at least with respect to FIGS. 2 and 4.

The linguistic validator 160 may be used to selectively filter substitute token candidates and/or resultant texts (e.g., based on a linguistic validation technique), as described at least with respect to FIG. 4.

Figure 5:
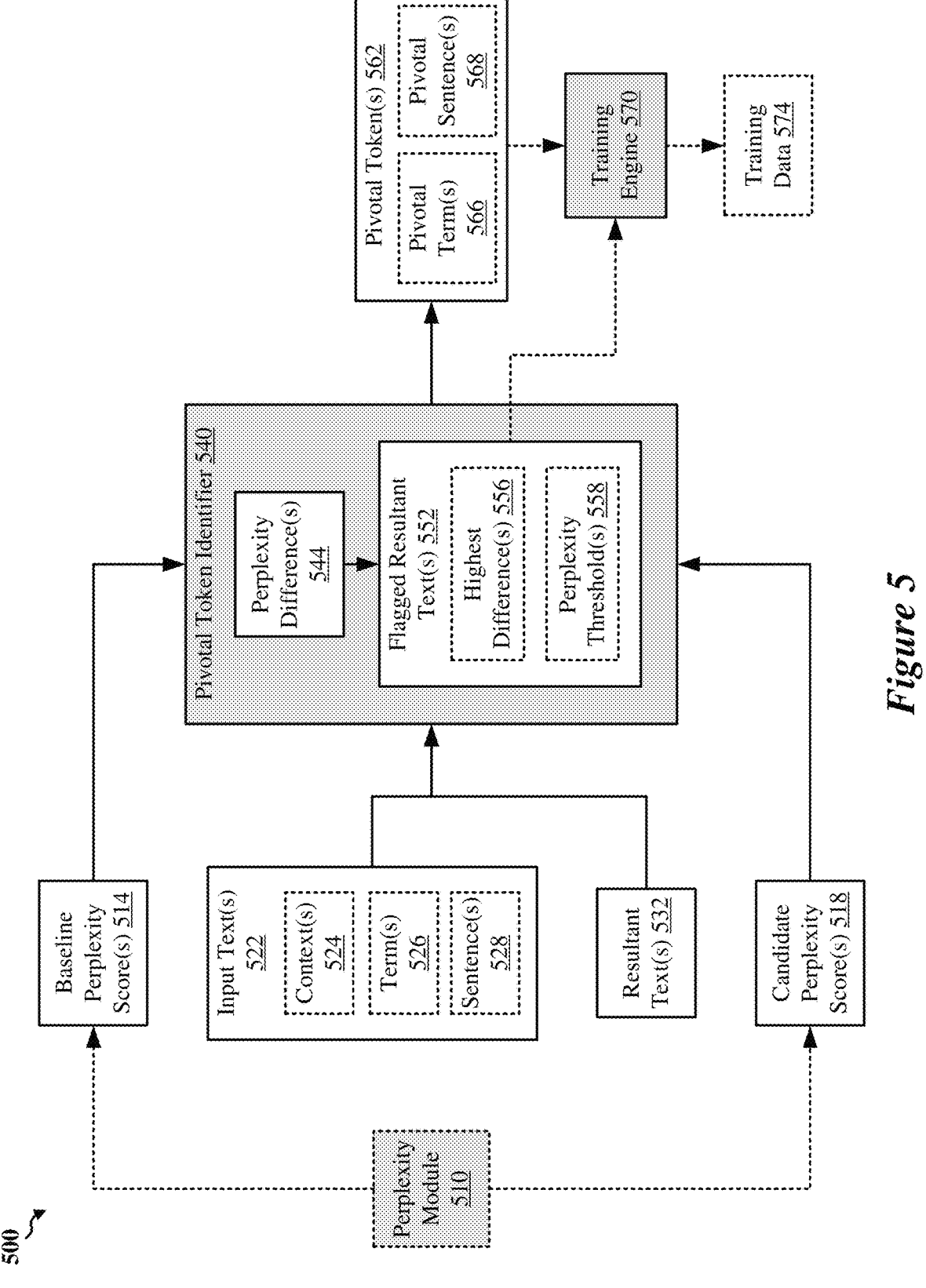
FIG. 5 shows an example process flow for identifying pivotal tokens, according to some implementations.

The perplexity module 170 may be used to determine perplexity scores for input texts and/or resultant texts, as described at least with respect to FIGS. 2 and 5.

The pivotal token identifier 180 may be used to identify pivotal tokens within input texts based on perplexity scores, as described at least with respect to FIGS. 2 and 5.

The training engine 190 may be used to generate training data and/or use training data to train an LM (e.g., the LM 130), as described at least with respect to FIG. 5.

The LM 130, the token replacement engine 150, the linguistic validator 160, the perplexity module 170, the pivotal token identifier 180, and the training engine 190, are implemented in software, hardware, or a combination thereof. In some implementations, any one or more of the LM 130, the token replacement engine 150, the linguistic validator 160, the perplexity module 170, the pivotal token identifier 180, or the training engine 190 is embodied in instructions that, when executed by the processor 110, cause the computing system 100 to perform operations. In various implementations, the instructions of one or more of said components and/or the interface 120 are stored in the memory 114, the database 140, or a different suitable memory, and are in any suitable programming language format for execution by the computing system 100, such as by the processor 110. It is to be understood that the particular architecture of the computing system 100 shown in FIG. 1 is but one example of a variety of different architectures within which aspects of the present disclosure can be implemented. For example, in some implementations, components of the computing system 100 are distributed across multiple devices, included in fewer components, and so on. While the below examples related to identifying pivotal tokens are described with reference to the computing system 100, other suitable system configurations may be used.

FIG. 2 shows an example process flow 200 for identifying pivotal tokens, according to some implementations, and may be performed by one or more processors of a computing system, such as the computing system 100 described with respect to FIG. 1. The example process flow 200 shows a token replacement engine 210, a perplexity module 220, and a pivotal token identifier 230, which may be examples of the token replacement engine 150, the perplexity module 170, and the pivotal token identifier 180 described with respect to FIG. 1, respectively.

The example process flow 200 starts with receiving a transmission 204. The transmission 204 may be received over a communications network from a computing device. In some instances, the transmission 204 is received from a user 202. The transmission 204 includes one or more input texts 208. Each of the input texts 208 may be formed from a sequence of tokens. The input texts 208 may be provided to the token replacement engine 210.

The example process flow 200 continues with generating, using the token replacement engine 210, substitute token candidates 214 for each of the input texts 208. The substitute token candidates 214 for a given input text may be generated based on a context of the given input text. In some implementations, at least a portion of the context for the input texts 208 is provided in the transmission 204. In some implementations, at least a portion of the context for the input texts 208 is determined by the token replacement engine 210. In such implementations, the token replacement engine 210 may be an LM, such as one of the LMs 130 of FIG. 1. Each of the substitute token candidates 214 may be mapped to a corresponding resultant text 218. In each resultant text, the substitute token candidate replaces one or more tokens in the associated input text.

As a simplified, non-limiting example, an input text may be "The company increased its revenue in the last quarter.", two example substitute token candidates generated for the term "increased" in the input text may be "decreased" and "boosted", and two example resultant texts for the input text may be "The company decreased its revenue in the last quarter." and "The company boosted its revenue in the last quarter.". In some implementations, ones of the substitute token candidates and/or the resultant texts may be selectively filtered based on a linguistic validation technique. For this example, if one of the substitute token candidates generated for the term "increased" is "think", the linguistic validation technique may be used to filter the substitute token candidate based on determining that "The company think its revenue in the last quarter." has a linguistic coherence below a linguistic threshold, as further described with respect to FIG. 4. The resultant texts 218 and the input texts 208 may be provided to the perplexity module 220.

The example process flow 200 continues with determining, using the perplexity module 220, a baseline perplexity score 224 for each of the input texts 208 and a candidate perplexity score 228 for each of the resultant texts 218. The perplexity scores may represent an indication of how "surprised" a model (e.g., an LM) is by the corresponding sequence of tokens, terms, or sentences. In some implementations, the perplexity module 220 itself is an LM and may determine the perplexity scores using a formula that evaluates the probability of the corresponding sequence of tokens, terms, or sentences. In some instances, the perplexity score is determined for a given sequence based on a cross-entropy loss between the predicted probability distribution of each next token and the actual next token. In some implementations, the baseline perplexity scores 224 for the input texts 208 are predetermined (e.g., provided as metadata in the transmission 204).

Each of the perplexity scores may be based on the context of the corresponding input text. It will be appreciated that the context of the input text may also carry context related to the initial generation of the input text. For instance, if the input text was generated in response to a particular input prompt (and then deemed to align with one or more response preferences, as described with respect to FIG. 3), the context for the input text may also carry context related to the particular input prompt. In some implementations, the perplexity module 220 generates conditional perplexity scores reflecting how "surprising" a resultant text is given the context of its associated input text. In this manner, the system may capture potential semantic relationships (e.g., contradictions or entailments) between input texts and substitute token candidates. By evaluating a likelihood of a candidate substitute token, candidate substitute term, or candidate substitute sentence in view of the meaning or content of the reference input text, the system can identify pivotal tokens that significantly impact the contextual meaning of the reference input text. For the non-limiting example above, the baseline perplexity score for the input text ("The company increased its revenue in the last quarter.") may be a reference point (e.g., 0.21 or any other value). For this example, the candidate perplexity score for the first resultant text ("The company decreased its revenue in the last quarter.") may be relatively distant from the reference point (e.g., 1.65) based on determining that a contextual meaning of the first resultant text is the opposite of the contextual meaning of the input text (i.e., due to the semantic contradiction with the original sentence). For this example, the candidate perplexity score for the second resultant text ("The company boosted its revenue in the last quarter.") may be relatively closer to the reference point (e.g., 0.42) based on determining that a contextual meaning of the second resultant text is relatively close in meaning to the contextual meaning of the input text. The baseline perplexity scores 224 and the candidate perplexity scores 228 may be provided to the pivotal token identifier 230.

The example process flow 200 continues with identifying, using the pivotal token identifier 230, one or more pivotal tokens 234 within each respective input text based on the baseline perplexity score 224 determined for the respective input text and the candidate perplexity scores 228 determined for the resultant texts associated with the respective input text. In some implementations, identifying the pivotal tokens 234 for a given input text is based in part on determining a perplexity difference between the baseline perplexity score and each of the candidate perplexity scores associated with the given input text. For instance, a sharp increase in perplexity may indicate that the replaced token carries significant meaning or context (i.e., is "pivotal") because a higher perplexity score suggests that the model is more surprised by the sequence when a critical token is changed. For the example above, the perplexity difference between the baseline perplexity score and the candidate perplexity score determined for the first resultant text may be relatively higher (i.e., 1.65−0.21=1.44), and the perplexity difference between the baseline perplexity score and the candidate perplexity score determined for the second resultant text may be relatively lower (i.e., 0.42−0.21=0.21). In various implementations, significant perplexity differences (i.e., increases) may be deemed "pivotal." For this example, if an example perplexity increase threshold is 1.25, the first resultant text (and the corresponding substitute token candidate, i.e., "decreased") may be flagged, and thus the pivotal term ("increased") in the associated input text ("The company increased its revenue in the last quarter.") may be identified as one of the pivotal tokens 234. It will be appreciated that, for purposes of discussion herein, a "substitute token" or a "pivotal token" may comprise a sequence including one token or any number of tokens.

Figure 3:
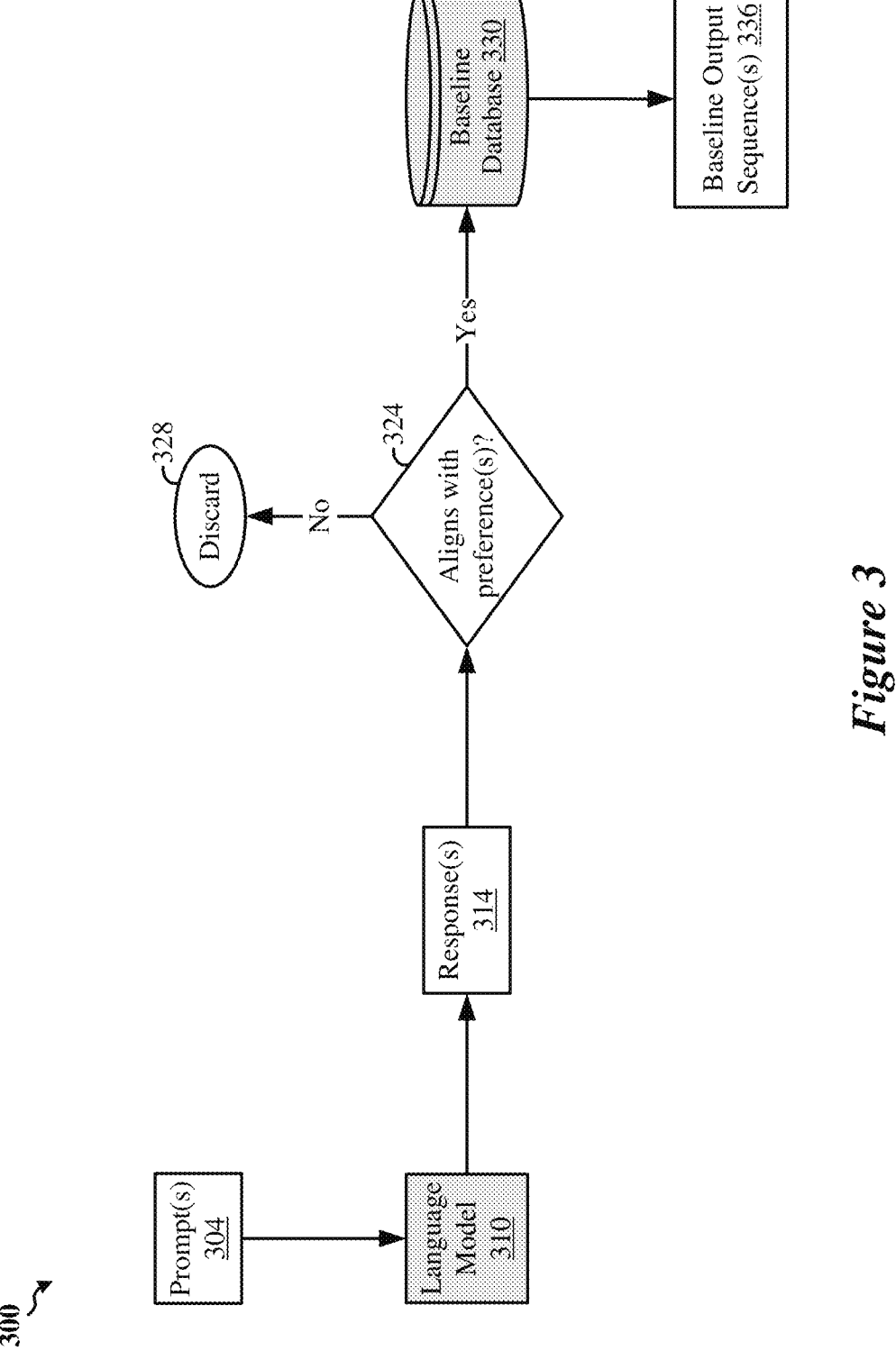
FIG. 3 shows an example process flow for receiving input texts, according to some implementations.

FIG. 3 shows an example process flow 300 for receiving input texts, according to some implementations, and may be performed by one or more processors of a computing system, such as the computing system 100 described with respect to FIG. 1. The example process flow 300 shows a language model (LM) 310 and a baseline database 330, which may be examples of the LM 130 and the database 140, respectively, described with respect to FIG. 1.

The example process flow 300 starts with providing one or more input prompts 304 to the LM 310. Each of the prompts 304 may cause the LM 310 to generate a corresponding response 314. The prompts 304 and the output responses 314 may be comprised of sequences of tokens, which may be concatenated into sequences of terms, sentences, or paragraphs. At decision block 324, each of the responses 314 may be evaluated to determine whether the response aligns with one or more response preferences. The responses 314 may be evaluated by a human reviewer, an automated system, or another LM, that compares each response with any type of objective or subjective preference (e.g., a tone, a style, a factual accuracy, a subjective desire, or the like). For example, human review of output may involve a reviewer evaluating the response against a set of predefined preferences and annotating the response with feedback indicating whether it aligns with or deviates from those preferences. As another example, another LM may review the output and generate an approval or disapproval of each response based on its own learned preferences. The ones of the responses 314 that do not align with the preferences may be discarded at block 328. In some implementations, responses 314 that do not align with the preferences may not be discarded and instead used in other manners, such as being fed back into the LM 310 for further refinement or being stored in a separate database for error analysis. The ones of the responses 314 that do align with the preferences may be stored in the baseline database 330. For instance, the responses 314 that align with the preferences may be stored in the baseline database 330 using a combination of data structures, such as hash tables and indexing algorithms, thereby enabling efficient management and retrieval of large volumes of data. Thereafter, such responses 314 may be obtained from the baseline database 330 as one or more baseline output sequences 336, which may be an example of the one or more input texts 208 of FIG. 2.

As a non-limiting example, a prompt may be a collection of information related to a company's recent actions accompanied with a request for the LM 310 to generate a single sentence indicating an insight related to the company's recent actions based on the collection of information. If the output response from the LM 310 aligns with one or more preferences (e.g., "The company increased its revenue in the last quarter.", which is assumed to align with the preferences for this example), the output may be flagged as aligning with the preferences and stored in the baseline database 330. By contrast, if the output does not align with the one or more preferences (e.g., "The company's revenue went up in the last quarter.", which is assumed to not align with the preferences for this example), the output may be flagged as not aligning with the preferences and discarded.

FIG. 4 shows an example process flow 400 for generating substitute tokens and resultant texts, according to some implementations, and may be performed by one or more processors of a computing system, such as the computing system 100 described with respect to FIG. 1. The example process flow 400 shows a token replacement engine 410, a language model (LM) vocabulary 420, and a linguistic validator 430, which may be examples of the token replacement engine 210, the database 140, and the linguistic validator 160, respectively, described with respect to FIGS. 1-2.

The example process flow 400 starts with obtaining one or more input texts 402 at the token replacement engine 410. The input texts 402 may be an example of the baseline output sequences 336 of FIG. 3. Each of the input texts 402 may be associated with a corresponding context 404, which may be in the form of metadata, plain text, dense vector representations, or any other suitable format for representing a contextual meaning of the input text and/or a prompt (or reasoning) associated with generating the input text. Each of the input texts 402 may comprise a sequence including one or more tokens (e.g., 'un' 'believ' 'able'), one or more terms 406 (e.g., 'the' 'company' 'increased' 'its' 'revenue') that are each comprised of one or more tokens, one or more sentences 408 (e.g., 'The company increased its revenue.' 'Business is booming.') that are each comprised of one or more terms that are each comprised of one or more tokens, one or more paragraphs, or the like.

The example process flow 400 continues with generating, using the token replacement engine 410, substitute token candidates 422, which may be an example of the substitute token candidates 214 of FIG. 2. In some implementations, the substitute token candidates 422 comprise, for each token in each input text, one substitute token candidate for each token in an LM vocabulary 420 associated with the token replacement engine 410. As a non-limiting example, if the LM vocabulary 420 includes 50,000 tokens and a given input text includes four (4) tokens, the token replacement engine 410 may generate 200,000 (i.e., 4×50,000) substitute token candidates for the given input text. In some other implementations, the LM vocabulary 420 may be a term-based database derived from a token-based vocabulary used by the LM in generating responses. As a non-limiting example, if the vocabulary used by the LM in generating responses includes 50,000 tokens, the derived term-based database may include millions of candidate terms for potential replacement. Accordingly, in some implementations, the substitute token candidates 422 are selectively generated for each input text based on the context 404 associated with the input text, thereby reducing the number of substitute token candidates generated while maximizing a contextual relevance between the substitute token candidates 422 and the input texts 402. In such implementations, the token replacement engine 410 may be an LM trained to suggest alternative tokens for each token (which can be terms/words, subwords, characters, sentences, or the like) in a given input text, where each suggested alternative token is meant to be a context-aware replacement that reflects the subtleties of the surrounding text (i.e., the context 404). In other words, the token replacement engine 410 generates, for each input text, a set of substitute token candidates that each could potentially replace the associated original token, as informed by the context 404 and the LM's understanding of language.

For example, each input text may include a sequence of terms (words), and each substitute token candidate may be a substitute for at least one of the terms in each sequence. In such implementations, the token replacement engine 410 may selectively generate the substitute token candidates 422 based on selectively identifying one or more of the terms for replacement based on the context 404 of the input text, and selectively identifying, for each of the terms for replacement, a set of substitute terms 426 based on a context of the term within the context 404 of the input text. As a simplified, non-limiting example, a given input text may include the terms "The technician calibrated the sensor before initiating the protocol," the terms "technician" and "sensor" may be selectively identified for replacement based on the context 404, and a set of substitute terms 426 (e.g., "engineer," "device," "instrument," etc.) may be selectively generated for each of the "technician" and "sensor" terms.

As another example, each input text may include a sequence of sentences (each formed from a sequence of terms), and each substitute token candidate may be a substitute for at least one of the sentences in each sequence. In such implementations, the token replacement engine 410 may selectively generate the substitute token candidates 422 based on selectively identifying one or more of the sentences for replacement based on the context 404 of the input text, and selectively identifying, for each of the sentences for replacement, a set of substitute sentences 428 based on a context of the sentence within the context 404 of the input text. As a simplified, non-limiting example, a given input text may include the sentences "The sun is shining. The birds are singing.," the context 404 may indicate that the input text is related to weather, the sentence "The birds are singing" may be selectively identified for replacement, and a set of substitute sentences 428 (e.g., "A gentle breeze is blowing.," "The forecast calls for clear skies.", etc.) may be selectively generated for the identified sentence.

The example process flow 400 may continue with selectively filtering, using the linguistic validator 430, the substitute token candidates 422 based on a linguistic validation technique. Specifically, even in implementations where the token replacement engine 410 generates the substitute token candidates 422 based on the context 404, a portion of the substitute token candidates 422 may not be desirable for further processing. The linguistic validation technique may include, for each substitute token candidate 422, determining whether a linguistic coherence 434 of the substitute token candidate (when used to replace one or more tokens in the original input text) is greater than a linguistics threshold 438. In some implementations, the linguistic validator 430 is an LM (e.g., one of the LMs 130 of FIG. 1) configured to act as a judge to evaluate the impact of token replacements on the corresponding input text's coherence. Specifically, the linguistic validator 430 may generate, for each substitute token candidate 422, a measure of linguistic coherence 434 (e.g., a value 0-1) based on a linguistic evaluation of the features of the substitute token candidate (e.g., grammatical correctness, semantic consistency, idiomatic expression usage, or the like) and compares the linguistic coherence 434 with the linguistics threshold 438. In evaluating the substitute token candidates 422, the linguistic validator 430 may perform tasks such as paraphrasing, explanation generation, and step-by-step reasoning to assess whether the replaced token introduces a logical inconsistency. Specifically, the linguistic validator 430 analyzes the text with the replaced token to determine whether the change causes a semantic misalignment.

The linguistic coherences 434 may be determined independent of the contexts 404. In other words, the linguistic validator 430 generates the linguistic coherences 434 without considering the contexts 404, thereby enabling the system to assess the fundamental linguistic soundness of each substitute token candidate without being influenced by its specific contextual relevance. By separating linguistic coherence evaluation from context-dependent factors, the system efficiently eliminates candidates that are linguistically flawed or implausible, thereby enhancing the efficiency and accuracy of identifying pivotal tokens downstream and allowing for greater adaptability across diverse domains and applications of any complexity. In various implementations, the linguistics threshold 438 may be tuned based on the use case to balance precision and recall. If the linguistic coherence 434 is above the linguistics threshold 438, then the given substitute token candidate may be retained (i.e., the linguistic validator 430 refrains from filtering the given substitute token candidate); otherwise, if the linguistic coherence 434 is not above the linguistics threshold 438, the given substitute token candidate may be filtered out as a filtered candidate 442 (e.g., a filtered substitute 448). In these manners, the linguistic validator 430 helps enable the system to determine whether a pivotal token has been identified due to a meaningful change in the text's meaning rather than an incoherent alteration.

The example process flow 400 continues with mapping or inserting each (e.g., remaining) substitute token candidate 422 into a corresponding resultant text 452 in which the substitute token candidate replaces the associated sequence of tokens (e.g., or terms or sentences, etc.) in the original input text 402. The resultant texts 452 may be an example of the resultant texts 218 of FIG. 2. Thereafter, the resultant texts 452 may be selectively filtered in a similar manner as described above with respect to the substitute token candidates 422. Specifically, for each resultant text 452, the linguistic validator 430 may determine (independent of the contexts 404) whether a linguistic coherence 434 of the resultant text is greater than a linguistics threshold 438 and selectively filter the resultant text accordingly. The resultant texts 452 that are deemed not to have a linguistic coherence 434 greater than the linguistic threshold 438 may be filtered out as filtered candidates 442 (e.g., filtered resultant texts 458). By contrast, the resultant texts 452 that are deemed to have a linguistic coherence 434 greater than the linguistics threshold 438 may be considered validated texts 468 and thus retained in the resultant texts 452.

In some implementations, the linguistic validator 430 selectively filters the substitute token candidates 422 and refrains from selectively filtering the resultant texts 452. In some other implementations, the linguistic validator 430 selectively filters the resultant texts 452 and refrains from selectively filtering the substitute token candidates 422. In some other implementations, the linguistic validator 430 selectively filters the substitute token candidates 422 and selectively filters the resultant texts 452. In some other implementations, the linguistic validator 430 refrains from selectively filtering the substitute token candidates 422 and refrains from selectively filtering the resultant texts 452.

FIG. 5 shows an example process flow 500 for identifying pivotal tokens, according to some implementations, and may be performed by one or more processors of a computing system, such as the computing system 100 described with respect to FIG. 1. The example process flow 500 shows a perplexity module 510, a pivotal token identifier 540, and a training engine 570, which may be examples of the perplexity module 220, the pivotal token identifier 230, and the training engine 190, respectively, described with respect to FIGS. 1-2.

The example process flow 500 starts with obtaining baseline perplexity scores 514 and candidate perplexity scores 518, such as from the perplexity module 510. The baseline perplexity scores 514 and the candidate perplexity scores 518 may be examples of the baseline perplexity scores 224 and the candidate perplexity scores 228, respectively, described in connection with FIG. 2. Each of the baseline perplexity scores 514 may be mapped to a corresponding input text of a plurality of input texts 522, which may be an example of the input texts 402 of FIG. 4. Each of the input texts 522 may be mapped to a corresponding context of a plurality of contexts 524, which may be an example of the contexts 404 of FIG. 4. In various implementations, ones of the input texts 522 may comprise sequences of terms 526 and/or sequences of sentences 528, which may be examples of the terms 406 and the sentences 408, respectively, of FIG. 4. Each of the candidate perplexity scores 518 may be mapped to a corresponding resultant text of a plurality of resultant texts 532, which may be an example of the resultant texts 452 of FIG. 4. The baseline perplexity scores 514 and the candidate perplexity scores 518 may be provided to the pivotal token identifier 540.

The example process flow 500 continues with determining, using the pivotal token identifier 540, a set of perplexity differences 544 for the pairs of perplexity scores. Specifically, for each respective resultant text 532 associated with a given input text 522, a perplexity difference 544 is determined based on a difference between the baseline perplexity score 514 mapped to the given input text 522 and the candidate perplexity score 518 mapped to the respective resultant text 532. As a non-limiting example, if a given input text 522 is associated with 10,000 resultant texts 532, the pivotal token identifier 540 generates 10,000 perplexity differences 544 for the given input text 522. The contexts 524 may be vector representations that embed grammar, meaning, world knowledge, reasoning, and the like, for each respective input text. Accordingly, the perplexity differences 544 may represent a semantic contradiction that quantifies an extent to which a candidate resultant text's semantic path deviates from a baseline input text's semantic path in the vector space. Specifically, if the candidate is semantically similar to the baseline, the perplexity difference 544 will be low (indicating a small deviation in vector space), and if the candidate is semantically contradictory to the baseline, the perplexity difference 544 will be high (indicating a larger deviation in vector space).

The example process flow 500 continues with flagging, using the pivotal token identifier 540, one or more of the resultant texts 532 (i.e., a set of flagged resultant texts 552) based on the perplexity differences 544. In some implementations, the pivotal token identifier 540 flags a top K (e.g., 1, 3, 5, 10, 100, etc.) resultant texts associated with the top K highest differences 556 for each respective input text. As a non-limiting example, if K is 1, a single resultant text 532 will be flagged for each respective input text, i.e., the resultant text having the highest perplexity difference 544 for the respective input text. In some other implementations, the pivotal token identifier 540 flags, for each respective input text, any of the respective input text's resultant texts 532 that are associated with a perplexity difference 544 greater than a perplexity threshold 558. In such implementations, some input texts may be associated with zero flagged resultant texts 552 (i.e., none of the resultant texts 532 associated with the respective input text resulted in a perplexity difference 544 greater than the perplexity threshold 558), while other input texts may be associated with hundreds or thousands of flagged resultant texts 552 (i.e., hundreds or thousands of the resultant texts 532 associated with the respective input text resulted in a perplexity difference 544 greater than the perplexity threshold 558). The perplexity threshold 558 may be tuned based on the use case. For instance, the perplexity threshold 558 may be set relatively higher when the use case is better suited to prioritize precision over recall (e.g., identifying pivotal tokens for legal documents), and the perplexity threshold 558 may be set relatively lower when the use case is better suited to prioritize recall over precision (e.g., identifying pivotal tokens for creative writing applications).

The example process flow 500 continues with identifying, using the pivotal token identifier 540, one or more pivotal tokens 562 within the input texts 522 based on the flagged resultant texts 552. The pivotal tokens 562 may be an example of the pivotal tokens 234 of FIG. 2. The number of pivotal tokens 562 may be the same as the number of flagged resultant texts 552. As a non-limiting example, if the flagged resultant texts 552 include 100,000 of the resultant texts 532, the set of pivotal tokens 562 may include 100,000 pivotal tokens. Each of the pivotal tokens 562 may comprise the sequence of tokens in the original input text 522 that is replaced in the corresponding flagged resultant text 552. In addition, or in the alternative, each of the pivotal tokens 562 may be mapped to the replacement text (or "substitute token candidate") used to replace the sequence of tokens in the original input text 522. In various implementations, the sequence of tokens comprises one or more terms deemed as pivotal terms 566 and/or one or more sentences deemed as pivotal sentences 568. As a non-limiting example, an original input text 522 may be "The company increased its revenue in the last quarter.", a flagged resultant text 552 for the original input text 522 may be "The company decreased its revenue in the last quarter.", a pivotal token 562 identified for the original input text 522 may be "increased" (i.e., a pivotal term 566, for this example), and a replacement text mapped to the pivotal token 562 may be "decreased". It will be understood that any number of resultant texts may be flagged for a given input text, and thus, any number of pivotal tokens (and/or corresponding replacement texts) may be identified for a given input text.

The example process flow 500 continues with generating, using the training engine 570, training data 574 based at least in part on the pivotal tokens 562 and the flagged resultant texts 552. Although not shown for simplicity, the training data 574 may also be generated based in part on the relevant input texts 522 mapped to the pivotal tokens 562 and the flagged resultant texts 552 (which may include all of the input texts 522 in some instances). In some implementations, the training data is for a direct preference optimization (DPO) technique. In such implementations, generating the training data 574 may include generating, for each of the relevant input texts 522, one or more DPO pairs based on the pivotal tokens 562 and flagged resultant texts 552 associated with the relevant input text. For instance, each DPO pair may include the relevant input text 522 and the flagged resultant text 552 in which the pivotal token 562 is replaced by the substitute token candidate mapped to the flagged resultant text 552. As a non-limiting example, a relevant input text 522 may be "The company increased its revenue in the last quarter.", a flagged resultant text 552 may be "The company decreased its revenue in the last quarter.", a pivotal token 562 may be "increased", a mapped substitute token candidate may be "decreased", and the DPO pair may thus include (original text: "The company increased its revenue in the last quarter.", modified text: "The company decreased its revenue in the last quarter."). In various implementations, each DPO pair may also be mapped to additional information associated with the original text, such as the relevant context 524, which may include, for example, the original prompt (e.g., the prompt 304 of FIG. 3) used in generating the original text response (e.g., the response 314 of FIG. 3).

The DPO pairs may be used in conjunction with the DPO technique to train an LM until a loss value converges to a predetermined threshold amount for generating output aligned with one or more (e.g., human) preferences. Such training may include selecting a suitable loss function (e.g., mean squared error (MSE), cross-entropy loss, Kullback-Leibler (KL) divergence) and a suitable optimization algorithm (e.g., stochastic gradient descent (SGD), Adam optimizer, Root Mean Square Propagation (RMSProp)) for updating the LM's parameters so that a difference between the LM's output and the preferred output is minimized. Specifically, the DPO technique may include using the DPO pairs in the training data 574 to train the LM based on determining a loss value (via the selected loss function) that quantifies the divergence between the LM's output and the preferred output and iteratively minimizing the loss value (using the optimization algorithm) until the loss value converges to the predetermined threshold amount, thereby indicating that the LM is in alignment with the target preferences. The DPO loss function may determine the probabilities of the chosen and rejected responses in the context of the original prompt (P(preferred|prompt) and P(dispreferred|prompt)) so that the likelihood of the preferred response is increased relative to the dispreferred response. To optimize the DPO technique, the DPO loss function may cause the LM to assign a higher probability to the preferred response and a lower probability to the dispreferred response so that a difference between the log-probability of the preferred response and the log-probability of the dispreferred response is maximized.

In some implementations, the training engine 570 may iteratively update the DPO pairs. As a non-limiting example, after generating the example DPO pair for the relevant input text 522 based on the first flagged resultant text described above ("The company decreased its revenue in the last quarter."), the training engine 570 may receive a second flagged resultant text ("The company skyrocketed its revenue in the last quarter.") where the pivotal term 566 ("increased") is replaced by a different substitute token candidate (e.g., "skyrocketed") that results in a perplexity difference 544 higher than the perplexity difference associated with the first flagged resultant text. For this example, the training engine 570 may update the DPO pair for the relevant input text 522 to include (original text: "The company increased its revenue in the last quarter.", modified text: "The company skyrocketed its revenue in the last quarter."), which may be used to further refine the LM's understanding of preferences and improve output generation aligned with those preferences. In some implementations, a human-in-the-loop review process may be employed to further refine the DPO pairs, such as where pivotal tokens 562 and/or flagged resultant texts 552 are reviewed and validated by human evaluators to ensure that they align with the intended contexts and preferences. In some other implementations, the DPO pairs may be refined using an iterative refinement loop that refines or substitutes the pivotal tokens 562 based on suggestions from an LM.

In some implementations, the example process flow 500 may be implemented in real-time. In such implementations, the training engine 570 may generate the training data 574 in at least near real-time with the perplexity scores being received at the pivotal token identifier 540, which, in some instances, may be in at least near real-time with the input texts 522 and the resultant texts 532 being provided to the perplexity module 510, which, in some instances, may also be in at least near real-time with a user providing (e.g., via the interface 120) the input texts 522 to a token replacement engine of the system (e.g., the token replacement engine 410 of FIG. 4).

It will be appreciated that, in practical applications, the process flows 200, 300, 400, and 500 described above related to natural language processing (NLP) and text analysis may involve processing large volumes of input texts and generating vast amounts of data within a very short timeframe (e.g., in at least near real-time). For instance, the system may process millions of input texts including billions or trillions of tokens, and the LM vocabulary may include tens or hundreds of thousands of unique tokens. Accordingly, the number of substitute token candidates, resultant texts, perplexity differences, and sets of pivotal tokens may be extremely large. To efficiently handle such high-volume processing, various system components (e.g., the token replacement engine, the linguistic validator, the perplexity module, the pivotal token identifier, and/or the training engine) may be configured to utilize one or more specialized hardware accelerators, such as tensor processing units (TPUs) or graphics processing units (GPUs), that are optimized for machine learning (ML) workloads. Additionally, the system may use optimized data structures (e.g., sparse matrices, tensors, or the like) and various optimization techniques (e.g., parallel processing, distributed computing, model pruning, knowledge distillation, or the like) to efficiently manage and process the large amounts of data. The system may also utilize a cloud-based infrastructure (i.e., a suitable cloud computing platform that provides scalable and on-demand access to computing resources) and/or containerization (i.e., a suitable containerization technology that enables efficient deployment, management, and orchestration of containers in a distributed environment) to further improve scalability, reliability, and fault tolerance. In these manners, the system may be effectively scaled to handle real-world applications with high-throughput requirements, thereby enabling rapid processing of vast numbers of input texts while maintaining accuracy and coherence in identifying pivotal tokens.

FIG. 6 shows an illustrative flowchart 600 depicting an example operation for identifying pivotal tokens, according to some implementations, and may be performed by one or more processors of a computing system, such as the computing system 100 described with respect to FIG. 1. For example, at block 610, the computing system 100 receives, over a communications network from a computing device, a transmission including one or more input texts formed from a sequence of tokens. At block 620, the computing system 100 generates substitute token candidates for each input text based on its context, each substitute token candidate mapped to a resultant text in which the substitute token candidate replaces one or more tokens in the sequence. At block 630, the computing system 100 determines a baseline perplexity score for each input text. At block 640, the computing system 100 determines a candidate perplexity score for each resultant text associated with each input text. At block 650, the computing system 100 identifies one or more pivotal tokens within each respective input text based on the baseline perplexity scores and the candidate perplexity scores.

FIG. 7 shows an illustrative flowchart 700 depicting an example operation for identifying pivotal tokens, according to some implementations, and may be performed by one or more processors of a computing system, such as the computing system 100 described with respect to FIG. 1. For example, at block 710, the computing system 100 receives, over a communications network from a computing device, a transmission including one or more input texts formed from a sequence of tokens. At block 720, the computing system 100 generates substitute token candidates for each input text based on its context, each substitute token candidate mapped to a resultant text in which the substitute token candidate replaces one or more tokens in the sequence. At block 730, the computing system 100 selectively filters one or more of the substitute token candidates or the resultant texts based on a linguistic validation technique. At block 740, the computing system 100 determines a baseline perplexity score for each input text. At block 750, the computing system 100 determines a candidate perplexity score for each resultant text associated with each input text. At block 760, the computing system 100 identifies one or more pivotal tokens within each respective input text based on the baseline perplexity scores and the candidate perplexity scores.

As used herein, a phrase referring to "at least one of" a list of items refers to any combination of those items, including single members. As an example, "at least one of: a, b, or c" is intended to cover: a, b, c, a-b, a-c, b-c, and a-b-c. Similarly, unless noted otherwise, "or" is used inclusively herein, such that "a, b, or c" refers to any combination of those items, including single members.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A computer-implemented method for identifying pivotal tokens, the method performed by one or more processors of a computing system and comprising:

receiving, over a communications network from a computing device, a transmission including one or more input texts, each of the input texts formed from a sequence of tokens;

generating one or more substitute token candidates for each input text based on a contextual meaning of the input text, the contextual meaning determined by a language model (LM) in a vector space, and each of the substitute token candidates generated to test an impact on the contextual meaning of the input text when the substitute token candidate replaces one or more tokens in the input text;

generating, for each substitute token candidate, a resultant text in which the substitute token candidate replaces one or more tokens in the corresponding input text;

determining, for each resultant text, whether the replacement of the one or more tokens with the corresponding substitute token candidate results in the resultant text having a linguistic coherence below a linguistic threshold;

filtering ones of the resultant texts having a linguistic coherence below the linguistic threshold;

determining a baseline perplexity score for each input text, the baseline perplexity score quantifying the LM's uncertainty in predicting the respective input text without any of the substitute token candidates;

determining a candidate perplexity score for each remaining resultant text, the candidate perplexity score quantifying the LM's uncertainty in predicting the respective resultant text with the corresponding substitute token candidate;

determining, for each input text, a perplexity difference between (i) the baseline perplexity score determined for the respective input text and (ii) the candidate perplexity score determined for the remaining resultant text, wherein the perplexity difference quantifies an extent to which the substitute token candidate causes a semantic path of the resultant text to deviate from a semantic path of the input text in the vector space associated with the contextual meaning of the respective input text;

flagging one or more of the resultant texts associated with a perplexity difference exceeding a perplexity difference threshold; and identifying, as a pivotal token, the one or more tokens in the input text that were replaced by the substitute token candidate in each flagged resultant text.

2. The method of claim 1, wherein each of the input texts corresponds to a concatenation of output tokens from the LM, and wherein the output tokens align with a preferred response from the LM when receiving a particular input prompt.

3. The method of claim 1, wherein the substitute token candidates comprise, for each token in each input text, one substitute token candidate for each token in the LM's vocabulary.

4. The method of claim 1, wherein the substitute token candidates are selectively generated for the input text based on its contextual meaning.

5. The method of claim 4, wherein the input text includes a sequence of terms formed by the tokens, wherein each substitute token candidate is a substitute for one of the terms, and wherein selectively generating the substitute token candidates includes:

selectively identifying one or more of the terms for replacement based on the contextual meaning of the input text; and selectively identifying, for each of the terms for replacement, a set of substitute terms based on a contextual meaning of the term within the contextual meaning of the input text.

6. The method of claim 4, wherein the input text includes a sequence of sentences formed by sequences of terms formed by the tokens, wherein each substitute token candidate is a substitute for one of the sentences, and wherein selectively generating the substitute token candidates includes:

selectively identifying one or more of the sentences for replacement based on the contextual meaning of the input text; and selectively identifying, for each of the sentences for replacement, a set of substitute sentences based on a contextual meaning of the sentence within the contextual meaning of the input text.

7. The method of claim 1, wherein filtering ones the resultant texts is based on a linguistic validation technique.

8. The method of claim 7, wherein the linguistic validation technique comprises, for each resultant text:
  determining whether the linguistic coherence of the resultant text is greater than a linguistics threshold; and
  (i) filtering the resultant text responsive to determining that the linguistic coherence is not greater than the linguistics threshold or (ii) refraining from filtering the resultant text responsive to determining that the linguistic coherence is greater than the linguistics threshold.

9. The method of claim 8, wherein the linguistic coherences are determined independent of the contextual meaning of the input text.

10. The method of claim 1, wherein the baseline perplexity score and the candidate perplexity scores are based in part on the contextual meaning of the input text.

11. The method of claim 1, wherein each of the pivotal tokens comprises a subsequence of tokens forming a term within the input text, and wherein each of the substitute token candidates comprises a sequence of characters forming a substitute term.

12. The method of claim 1, wherein each of the pivotal tokens comprises a subsequence of tokens forming a sequence of terms into a sentence within the input text, and wherein each of the substitute token candidates comprises a sequence of terms forming a substitute sentence.

13. The method of claim 1, wherein a resultant text associated with a highest perplexity difference is flagged for the given input text.

14. The method of claim 1, further comprising:
  generating training data based on the pivotal tokens and the flagged resultant texts.

15. The method of claim 14, wherein the training data is for a direct preference optimization (DPO) technique, and wherein generating the training data includes:
  generating, for each input text, one or more DPO pairs based on its pivotal tokens and flagged resultant texts, wherein each DPO pair includes the input text and the resultant text in which the pivotal token is replaced by the substitute token candidate mapped to the flagged resultant text, wherein the DPO pairs are iteratively updated and used in conjunction with the DPO technique to train the LM until a loss value converges to a predetermined threshold amount for generating output aligned with one or more preferences.

16. A system for identifying pivotal tokens, the system comprising:
  one or more processors; and at least one memory coupled to the one or more processors and storing instructions that, when executed by the one or more processors, cause the system to perform operations including:
  receiving, over a communications network from a computing device, a transmission including one or more input texts, each of the input texts formed from a sequence of tokens;
  generating one or more substitute token candidates for each input text based on a contextual meaning of the input text, the contextual meaning determined by a language model (LM) in a vector space, and each of the substitute token candidates generated to test an impact on the contextual meaning of the input text when the substitute token candidate replaces one or more tokens in the input text;
  generating, for each substitute token candidate, a resultant text in which the substitute token candidate replaces one or more tokens in the corresponding input text;
  determining, for each resultant text, whether the replacement of the one or more tokens with the corresponding substitute token candidate results in the resultant text having a linguistic coherence below a linguistic threshold;
  filtering ones of the resultant texts having a linguistic coherence below the linguistic threshold;
  determining a baseline perplexity score for each input text, the baseline perplexity score quantifying the LM's uncertainty in predicting the respective input text without any of the substitute token candidates;
  determining a candidate perplexity score for each remaining resultant text, the candidate perplexity score quantifying the LM's uncertainty in predicting the respective resultant text with the corresponding substitute token candidate;
  determining, for each input text, a perplexity difference between (i) the baseline perplexity score determined for the respective input text and (ii) the candidate perplexity score determined for the remaining resultant text, wherein the perplexity difference quantifies an extent to which the substitute token candidate causes a semantic path of the resultant text to deviate from a semantic path of the input text in the vector space associated with the contextual meaning of the respective input text;
  flagging one or more of the resultant texts associated with a perplexity difference exceeding a perplexity difference threshold; and
  identifying, as a pivotal token, the one or more tokens in the input text that were replaced by the substitute token candidate in each flagged resultant text.

* * * * *